(12) United States Patent
Aguinaga et al.

(10) Patent No.: US 7,522,614 B1
(45) Date of Patent: Apr. 21, 2009

(54) MULTI-SERVICE ACCESS PLATFORM FOR TELECOMMUNICATIONS AND DATA NETWORKS

(75) Inventors: Salvador Aguinaga, Chicago, IL (US);
Dwight D. Dipert, Fox River Grove, IL (US); Richard Dynarski, Freehold, NJ (US); Gerard T. Jankauskas, Bellingham, MA (US); Martin A. K. Schwan, Chicago, IL (US); Brian Fitzpatrick, Arlington Heights, IL (US)

(73) Assignee: 3Com Corporation, Marlborough, MA (US)

( * ) Notice: Subject to any disclaimer, the term of this patent is extended or adjusted under 35 U.S.C. 154(b) by 1084 days.

(21) Appl. No.: 10/376,930

(22) Filed: Feb. 28, 2003

(51) Int. Cl.
*H04L 12/28* (2006.01)
*H04L 12/56* (2006.01)

(52) U.S. Cl. ..................... 370/401
(58) Field of Classification Search .......... 370/352, 370/356, 401, 466
See application file for complete search history.

(56) References Cited

U.S. PATENT DOCUMENTS

| | | | |
|---|---|---|---|
| 6,282,193 B1 | 8/2001 | Hluchyj et al. | 370/356 |
| 6,763,018 B1 * | 7/2004 | Puthiyandyil et al. | 370/352 |
| 6,931,461 B2 * | 8/2005 | Busse et al. | 710/60 |
| 2003/0031126 A1 * | 2/2003 | Mayweather et al. | 370/223 |
| 2007/0073932 A1 * | 3/2007 | Pike et al. | 710/58 |

OTHER PUBLICATIONS

Lee Jenkins, "Ethernet Over SONET Virtual Concatenation", Tellabs, Jan. 2002, 8 pgs.
"SONET Telecommunications Standard Primer", Tekronix, Aug. 2001, 39 pgs.
"3Comm® Corporation Unveils Next-Generation Total Control® 2000 Multiservice Access Platform At Supercomm 2000", http://ap.3com.com/news/pr00/jup0900a.html, printed Feb. 5, 2003, 4 pgs.
"3Com® Total Control® 2000: Multiservice Access Platform", 3Com Corporation, Jun. 2000, 2 pgs.
3Com Next-Generation Multiservice Access Platform, 3Com Corporation, Sep. 2000, 8 pgs.
http://mailman.xmission.com/pipermail/usr-tc/2000-November/003716.html, printed Feb. 5, 2003, 1 pg.

* cited by examiner

*Primary Examiner*—Kevin C Harper
(74) *Attorney, Agent, or Firm*—McDonnell Boehnen Hulbert & Berghoff LLP

(57) ABSTRACT

A multi-service access platform may have network interface cards and application cards. The network interface cards may interface the multi-service access platform to an ingress network and an egress network. The network interface cards may be coupled to the application cards by a network distribution bus. As a result, the application cards may perform digital signal processing on signals received from the ingress network. Additionally, the application cards may be coupled to a packet switching fabric. The packet switching fabric may facilitate exchange of signals between the application cards. Additionally, the packet switching fabric may permit exchange of the signals with the egress network.

43 Claims, 12 Drawing Sheets

Figure 4: Network Distribution Bus Slot Connectivity

Figure 7 Media Data Bus Slot Connectivity

Figure 8: System Control Bus Slot Connectivity

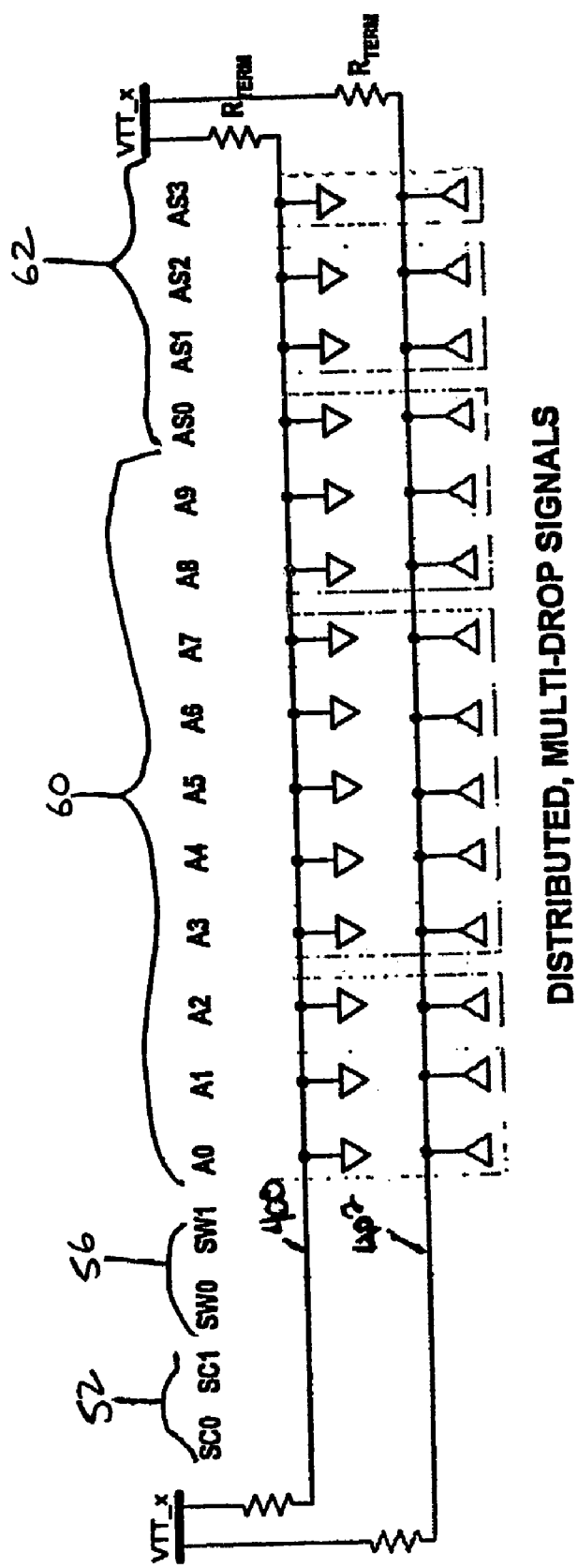
Figure 10. Time-Domain Multiplexed (TDM) Bus

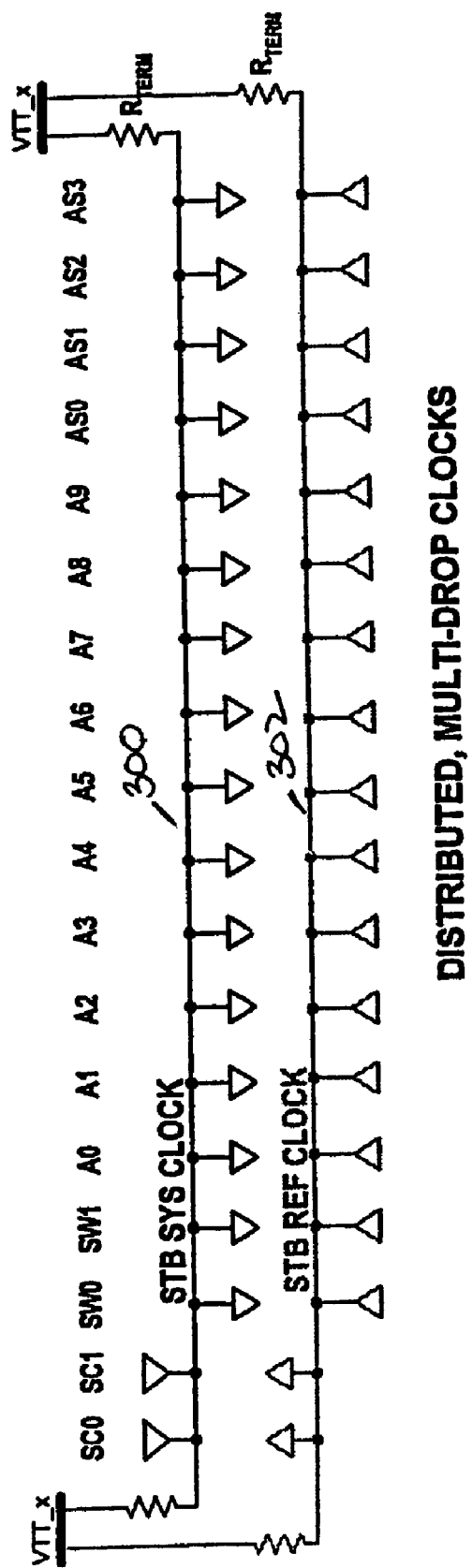
Figure 11: System Timing Bus (STB)

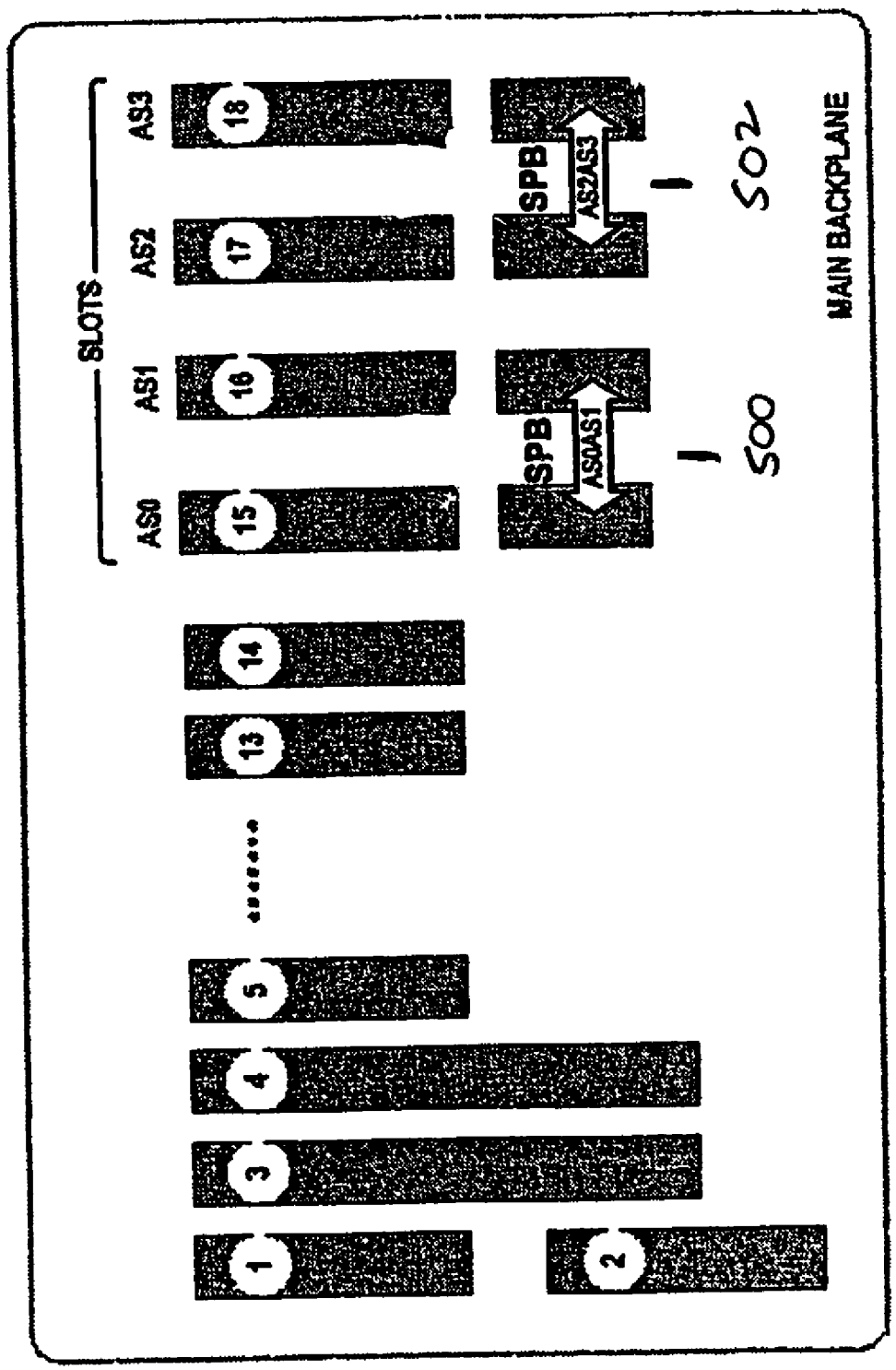
Figure 12: SONET Protection Bus (SPB)

MULTI-SERVICE ACCESS PLATFORM FOR TELECOMMUNICATIONS AND DATA NETWORKS

BACKGROUND

1. Field of the Invention

The present invention relates to telecommunications and data networks, and more particularly, to a multi-service access platform for telecommunications and data networks.

2. Description of the Related Art

Demand for communication services continues to rise dramatically. Every day, customers request that service providers provide additional types of communication services. For example, customers demand that the service providers provide remote-access services, voice over Internet (VoIP) services, and fax over Internet (FoIP) services through telecommunications and data networks. Remote-access services involve sending and receiving data to and from a computer and a server, respectively, typically through the telecommunications networks. The VoIP services allow for transmitting voice conversations through the data networks using the Internet protocol. Similar to VoIP, FoIP services allow for transmitting facsimile communications through the data networks using the Internet protocol. Customers demand other types of communication services in addition to those described here.

Manufacturers have responded to a need by the service providers to provide the additional types of communication services demanded by the customers. Manufacturers have developed solutions to upgrade the telecommunications and data networks. The solutions are designed to refit existing infrastructure. For example, network interfaces that facilitate exchange of voice and data signals in the telecommunications and data networks have a limited bandwidth. The manufacturers have developed ways to increase the bandwidth of the network interface by increasing a clock rate of the network interfaces. The increased bandwidth produced as a result of increasing the clock rate allows for the network interfaces to exchange an increased amount of voice and data signals in the telecommunications and data networks. Additionally, the manufacturers have developed network interfaces that conform to standard protocols such as time-division multiplexed (TDM) format, H.100, and H.110. The network interfaces allow for increased flexibility in the data signals that are exchanged by the telecommunications and data networks. The increase of the clock rate and the development of network interfaces that conform to the standard protocols optimize the telecommunications and data networks to provide the customers with the types of communication services demanded.

SUMMARY

The present invention stems from a realization that the solutions provided by the manufacturers for optimizing the telecommunications and data networks restrict future upgrade. The solutions optimized for the current telecommunication and data networks result in a more restricted and less generic architecture. As a result, when additional services are to be added to the telecommunications and data networks, the telecommunications and data networks must be substantially redesigned to accommodate the additional services: i.e., the solutions cannot accommodate additional services without costly rework or replacement.

In accordance with a principle aspect of the present invention, a multi-service access platform may transfer signals from an ingress network to an egress network. The ingress network may be a circuit-switched network such as a public switched telephone network (PSTN) and the egress network may be a packet-switched network, such as an Internet protocol (IP) network. The multi-service access platform may have network interface cards and application cards. The network interface cards may be coupled to each of the application cards by point-to-point links. And the application cards may be coupled together by a packet switching fabric. The application cards and the network interface cards may allow the multi-service access platform to provide communication services, e.g., narrowband data services (e.g., VoIP, FoIP), remote access IP telephony, wireless, and broadband services (e.g., cable access, asynchronous data subscriber line (ADSL)) over the ingress network and the egress network.

According to an exemplary embodiment of the present invention, a system for sending signals between the ingress network and the egress network may include network interface cards, application cards, and a switching fabric. The network interface cards may have ports for sending and receiving the signals with the ingress network. And the network interface cards may have point-to-point links for sending and receiving the signals with the application cards. The application cards may be connected by point-to-point links to packet switch cards. The packet switch cards may allow for the application cards to exchange signals between each other. Additionally, the packet switch cards may have ports for sending and receiving the signals with the egress network.

According to an alternative exemplary embodiment of the present invention, a system for sending signals between an ingress network and an egress network may also include network interface cards, application cards, and a switching fabric. The network interface cards, however, may have first ports for sending and receiving the signals with an ingress network, point-to-point links for sending and receiving the signals with the application cards, and second ports for sending and receiving the signals with the egress network. The application cards may have point-to-point links connected to packet switch cards. The packet switch cards may define a switching fabric for sending and receiving the signals between the application cards.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of present invention are described with reference to the following drawing, in which:

FIG. 10 illustrates a time-domain multiplexed bus on a back plane of the exemplary multi-service access platform;

FIG. 11 illustrates a system timing bus on the back plane of the exemplary multi-service access platform; and FIG. 12 illustrates a synchronous optical network (SONET) protection bus on the back plane of the exemplary multi-access platform.

DETAILED DESCRIPTION OF EXEMPLARY EMBODIMENTS

Figure 1:
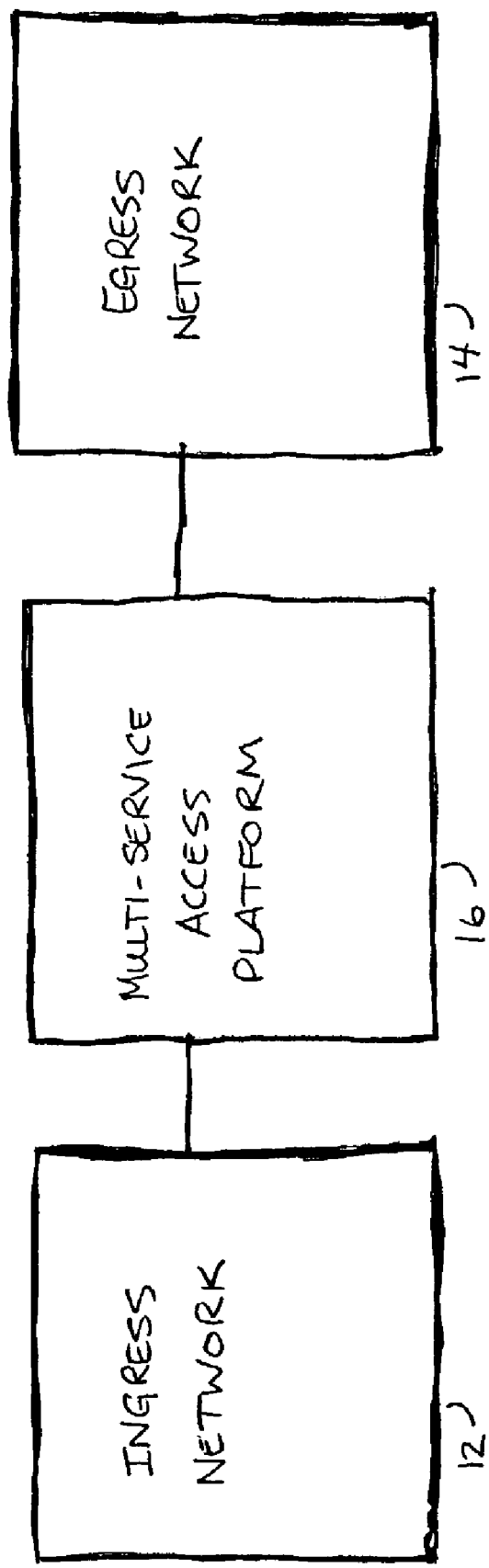
FIG. 1 is a block diagram of an exemplary network architecture in which exemplary embodiments of the present invention may be employed.

FIG. 1 is a block diagram of an exemplary network architecture in which exemplary embodiments of the present invention may be employed. Those skilled in the art will appreciate that many of the elements described herein are functional entities that may be implemented as discrete components or in conjunction with other components, in any suitable combination or location. Still further, various functions described herein as being performed by one or more entities may be carried out by hardware and/or by a processor programmed to execute an appropriate set of computer instructions stored in memory. Provided with the present disclosure, those skilled in the art can readily design the hardware and/or prepare the appropriate set of computer instructions for performing the various functions disclosed herein.

Referring to FIG. 1, the exemplary network architecture may include an ingress network 12 and an egress network 14. The ingress network 12 and the egress network 14 may each be circuit-switched networks such as public switched telephone networks (PSTN), packet-switched data networks (PDSN) such as Ethernet networks, synchronous optical networks (SONET), Internet protocol (IP) networks, or a combination thereof. Preferably, however, the ingress network 12 may be a circuit-switched network and the egress network 14 may be a packet-switched network.

The ingress network 12 and the egress network 14 may both be coupled to an exemplary multi-service access platform 16. The exemplary multi-service access platform 16 may facilitate provisioning of communication services over the ingress network 12 and the egress network 14. The communication services may include narrow band services such as VoIP and FoIP. Additionally or alternatively, the communication services may include remote access, Internet telephony, and wireless services. Still additionally or alternatively, the communication services may include broadband services such as cable access and ADSL. Other arrangements are also possible.

Figure 2:
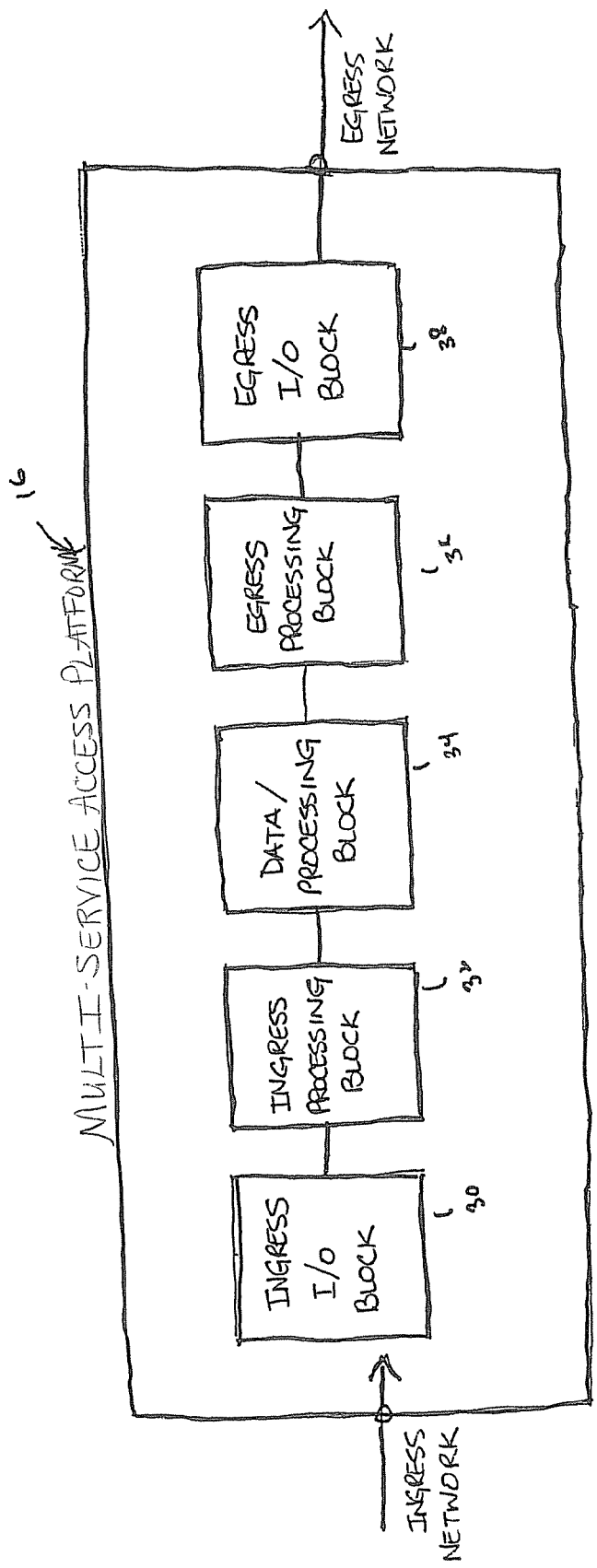
FIG. 2 is block diagram that illustrates an exemplary data flow through a multi-service access platform.

FIG. 2 is a block diagram that illustrates an exemplary data flow through the multi-service access platform 16. The block diagram describes a generic partitioning of the functional elements that make up the multi-service access platform 16. The functional elements include an ingress input/output (I/O) block 30, an ingress processing block 32, a data processing block 34, an egress processing block 36, and an egress I/O block 38. Collectively, the functional elements allow for provisioning the communication services over the ingress network 12 and the egress network 14.

Referring to FIG. 2, the ingress I/O block 30 may send and receive signals to and from, respectively, the ingress network 12. The ingress I/O block 30 may be an optical interface, for example, OC-3, OC-12, or OC-48, that conforms to SONET, SDH, or STM-1. Alternatively, the ingress I/O block 30 may be Gigabit Ethernet or 100 Mbps Ethernet interface. The ingress I/O block 30 may also change physical characteristics of the signals received from the ingress network. For example, the ingress I/O block 30 may convert optical signals received from the ingress network 12 into electrical signals. The electrical signals may be compatible with hardware on the multi-service access platform 16. Alternatively, the ingress I/O block 30 may convert electrical signals on the multi-service access platform 16 into optical signals. The optical signals may be compatible with the ingress network 12 or the egress network 14. Other arrangements are also possible.

Additionally, the ingress I/O block 30 may also perform the function of converting the signals from one format into another format. For example, in a VoIP application or low density application, the signals may take the form of a T1, T3, E1, or J1 signal. In higher density applications, data may take the form of channelized and framed signals such as OC-3, OC-12, OC-48, and E3, for example. The ingress I/O block 30 may break down the signals received from the ingress network 12 into TDM-based signals, such as DS1 and/or DS0 signals. For example, if the ingress I/O block 30 is an optical interface, then the ingress I/O block 30 may extract a payload of a SONET frame and forward the payload, defining DS1 and/or DS0 signals, to the ingress processing block 32. Other arrangements are also possible.

The ingress I/O block 30 may take a variety of forms. The ingress I/O block may take the form of a card, an interface cable connection, e.g., RJ-45, BNC, or a ribbon connector, which accepts signals, e.g., E1, E3, T1, T3, and STS-1, from the ingress network 12. The form of the ingress I/O block 30 may depend on the format of the signals defined by the ingress network 12, either optical or electrical, and whether the signals need to be broken down before being processed by the ingress processing block 32.

The ingress processing block 32 may operate on the signals received by the ingress I/O block 30. The ingress processing block 32 may convert the data defined by the signals into a format compatible with the communication services to be provided. For example, the ingress processing block 32 may have a G.711, G.723, G.729a coder/decoder (codec) which performs coding and decoding of the data defined by the signals. Additionally, the ingress processing block 32 may perform echo cancellation, compression, and decompression of the data. Still additionally, the ingress processing block 32 may convert the data into packets. The ingress processing block 32 may generate packets to facilitate routing of the data within the multi-service access platform 16 and over an IP network. Other arrangements are also possible.

The data processing block 34 may route the packets within the multi-service access platform 16. The packets may have a header, which defines a routing of the packets within the multi-service access platform 16. The data processing block 34 may analyze a header of a packet and route the packet to various cards, to be described later, within the multi-service access platform 16. The data processing block 34 may route packets within the multi-service access platform 16 in other ways known to those skilled in the art.

The egress processing block 36 may convert the data from the egress network 14 into a format compatible with the multi-service access platform 16. Similar to the ingress processing block 32, the egress processing block 36 may also have a coder/decoder (codec), and perform compression and decompression so as to provide various communication services. Additionally, the egress processing block 36 may format the packets on the multi-service access platform 16 for transmission over the egress network 14. For example, if the egress processing block 36 is communicatively coupled to an IP network, then egress processing block 36 may format the packets on the multi-service access platform 16 into IP or real-time transport packets (RTP) packets. Alternatively, the egress processing block 36 may aggregate DS0 and DS1 signals into T3, E3, T1, E1, or J1 signals for transmission over the egress network 14. Other arrangements are also possible.

Finally, the egress I/O block 38 may send and receive signals over the egress network 14. Similar to the ingress I/O block 30, the egress I/O block 38 may change physical characteristics of the signals, e.g., perform electrical-to-optical conversion and vice-versa, to be compatible with both the egress network 14 and hardware on the multi-service access platform 16.

The generic partitioning of the functional elements in FIG. 2 is exemplary in nature. Actual implementations of the multi-service access platform 16 may differ depending on the communication services to be provided and characteristics of the signals carried by the ingress network 12 and the egress network 14. Also, other data flows through the exemplary multi-service access platform may exist, in accordance with the exemplary embodiments of the present invention.

The multi-service access platform 16 may utilize a plurality of cards to perform the functions described by FIG. 2. The cards may include network interface cards, application cards, packet switch cards, system manager cards, and shelf controller cards. The network interface cards, application cards, packet switch cards, system manager cards, and shelf controller cards may fit into one or more slots of the multi-service access platform 16. The slots may enable the cards to be coupled together by a plurality of buses, the details of which will be described herein. Collectively, the cards may perform the functions described by FIG. 2.

Figure 3:
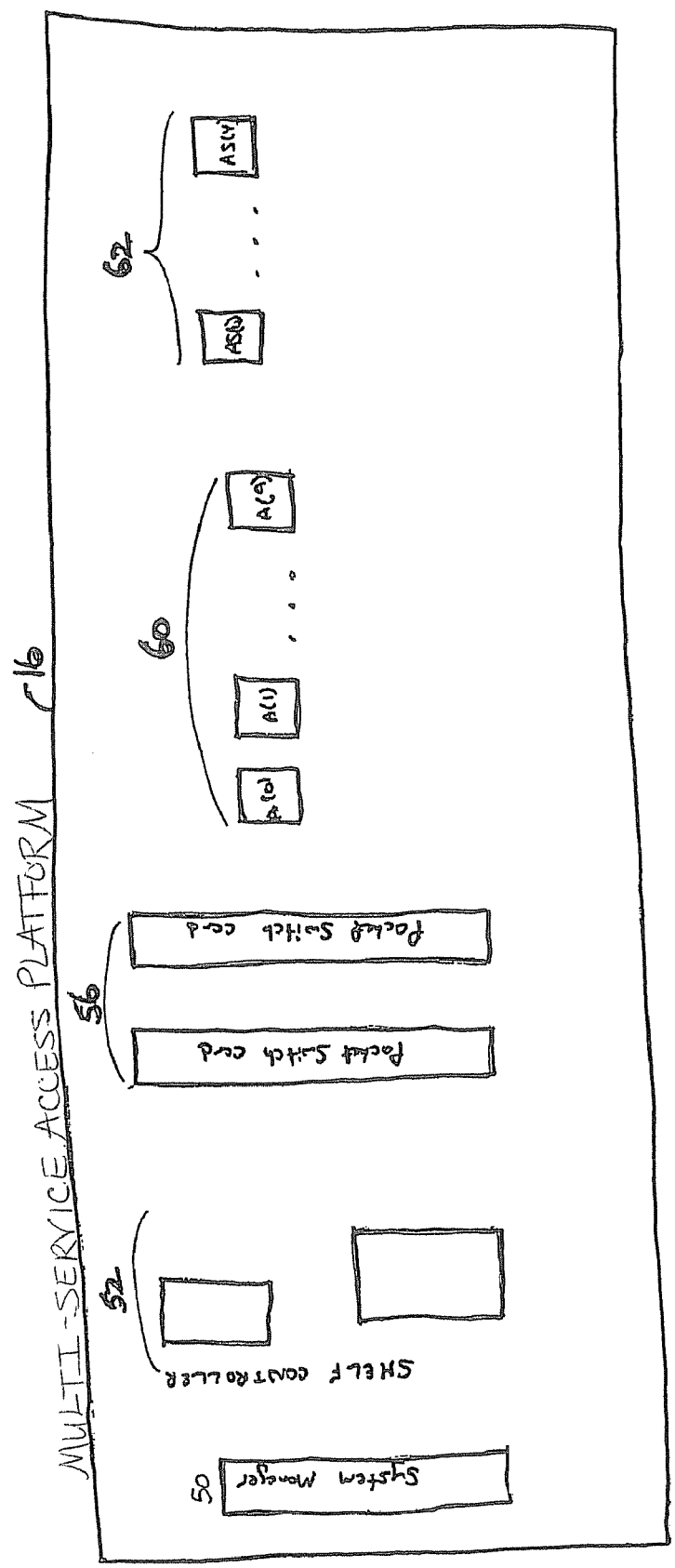
FIG. 3 illustrates an exemplary arrangement of cards within the multi-service access platform.

FIG. 3 illustrates an exemplary arrangement of the network interface cards 62, the application cards 60, the packet switch cards 56, the shelf controller cards 52, and the system manager cards 50 within the multi-service access platform 16. The multi-service access platform 16 may have one or more of each type of card so as to allow for redundancy and scalability of the multi-service platform 16. Additionally, the one or more of each type of card may allow for the multi-service access platform 16 to provide multiple types of communication services.

The exemplary arrangement of FIG. 3 has four network interface cards 62, AS(0) to AS(3), and ten application cards 60, A(0) to A(9). The network interface cards 62 may perform the function of the ingress I/O block 30 and the egress I/O block 38 of FIG. 2. The network interface cards 62 may interface the ingress network 12 and the egress network 14 to the multi-service access platform 16 by ingress ports and egress ports, respectively. The ingress ports and egress ports may be electrical or optical connections that provide access into the ingress network 12 and into the egress network 14, respectively, but other arrangements are also possible.

Additionally, the network interface cards 62 may strip out routing type information, such as SS7 signaling information, from the signals received from the ingress network 12, break down the signals into lower rate channels, e.g., DS0 and DS1 signals, and pass a plurality of DS0 or DS1 signals to the application cards 60. The network interface cards 62 may send the routing type information to a signaling gateway card. Alternatively, the signaling gateway card may interface directly with a signaling gateway in the ingress network 12 and the signaling gateway may send the routing information directly to the signaling gateway card. The signaling gateway card may be an application card 60 that processes the routing type information sent by the network interface cards 62 or the signaling gateway and produces instructions for processing the signals received from the ingress network 12.

For instance, the signaling gateway card may send the instructions to the application cards 62 over a system control bus (SCB) or media data bus (MDB), described below. The application cards 62 may correlate the instructions to the appropriate DS0 signals, for instance, so that the appropriate DS0 signals may be processed by the application card 62 in accordance with the instructions.

Alternatively, the signaling gateway card may send the instructions to the network interface cards 62 over the SCB or MDB. The network interface cards 62, in turn, may instruct the application cards 60, by way of the shelf controller 52 described below, to process the signals in accordance with the instructions.

Still alternatively, the signaling gateway card may send the instructions directly to the shelf controller 52 over the SCB. The shelf controller 52 may, in turn, instruct the application cards 60 to process the signals in accordance with the instructions. For instance, the instructions may define that the application cards 60 are to convert all the DS0 or DS1 signals received from the ingress network 12 or certain DS0 or DS1 signals received from the ingress network 12, into either IP packets or RTP packets for transmission over an egress network 14.

Instead of, or in addition to, obtaining the instructions for processing the signals from the signaling gateway card, the network interface card 62 may retrieve the instructions from memory. The network interface card 62 may send the instructions to the shelf controller 52. The shelf controller 52, in turn, may instruct the application cards 62 to process the certain DS0 or DS1 signals as defined by the instructions. Alternatively, the network interface card 62 may, itself, instruct the application cards 62 to process the certain DS0 or DS1 signals as defined by the instructions. Other arrangements are also possible consistent with the exemplary embodiments of the present invention.

The application cards 60 may perform the functions of the ingress processing block 32 and the egress processing block 36 of FIG. 2. The application cards 60, as instructed by the shelf controller 52, may, for example, convert TDM signals into IP packets to be sent to the packet switch card 56, described below. In turn, the packet switch card 56 may send the IP packets to the egress network 14. Alternatively, the application cards 60 may perform coding and decoding of the signals received from the ingress network 12. The application card 60 may have a digital signal processor (DSP), FPGA, or some other hardware/software for performing processing of the data received from the ingress network 12 or egress network 14.

The multi-service access platform 16 may also have packet switch cards 56. The packet switch cards 56 may define a switching fabric for the multi-service access platform 16. In other words, the packet switch cards 56 may perform the function of the data processing block 34, e.g., routing the packets between application cards 60, network interface cards 62, packet switch cards 56, shelf controller cards 52, system manager cards 50, and the egress network. The packet switch cards 56 may route the packets between the cards according to the header in the packet. Each card may be identified by a unique address, which is inserted into the header of the packet. For example, the unique address may allow the packet switch cards 56 to route the packet between application cards 60. Additionally, the packet switch cards 56 may interface to an egress network 14 such as a packet-switched network. As a result, packets may be routed between the multi-service access platform 16 and the packet switched network, via the packet switch cards 56.

Like, the network interface cards 62 and the application cards 60, there may be a plurality of packet-switch cards 56. The plurality of packet-switch cards 56 collectively support redundancy and ensure sufficient bandwidth to switch the packets between the network interface cards 62, the application cards 60, the packet switch cards 56, the shelf controller cards 52, and the system manager cards 50. The packet-switch cards 56 may be multi-level Ethernet cards, but other arrangements are also possible.

Additionally, the multi-service access platform may have two shelf controllers 52. The shelf controllers 52 may enable connectivity between the cards on the multi-service access platform. For example, the shelf controllers 52 may determine whether a card is inserted into a proper slot on the multi-service access platform 16. Each type of card, e.g., application card 60, network interface card 62, shelf controller card 52, may occupy a particular slot on the multi-service access platform 16. The shelf controller 52 may be programmed with which cards may be inserted into which slots. For example, the cards on the multi-service access platform 16 may have electrically eraseable programmable read only memory (EEPROM) or some other type of readable memory. The EEPROM may identify in which slots which cards may be inserted. The shelf controllers 52 may read the EEPROM on the cards to determine whether the cards are installed in the proper slots of the multi-service access platform 16.

Additionally, the shelf controller 52 may determine a status of the cards. The status of the card may indicate whether the card is operating properly. The cards may make available status indications, e.g., whether a card is active or disabled, to the shelf controller 52. The shelf controller 52 may determine the status by reading the status indications.

Still additionally, the shelf controller 52 may activate the cards on the multi-service access platform. The shelf controller 52 may apply power to the card if the card is compatible with a system configuration, e.g., the card is in a proper slot, as determined by the shelf controller 52. If the card is not compatible with the system configuration, then the shelf controller 52 might not apply power to the card.

Additionally, the shelf controller 52 may instruct the application cards as to the processing of the signals sent by a network interface card 62. As described above, the network interface card 62 may obtain instructions for the processing of the signals from the signaling gateway card or from memory, for instance. The network interface card 62 may send the instructions to the shelf controller 52. The shelf controller 52 may be programmed with capabilities of the various application cards. The shelf controller 52 may instruct appropriate application cards to process certain DS0 signals or certain DS1 signals sent by the network interface card 62, in accordance with the instructions. Also, the shelf controller 52 may instruct the application cards as to how the certain DS0 signals or certain DS1 signals are to be processed. For instance, the shelf controller may instruct two application cards of the multi-service access platform 16 to execute computer instructions or invoke hardware logic for converting DS0 signals 1 to 100 received from the ingress network 12 into packets.

Additionally or alternatively, the shelf controller 52 may instruct the network interface cards 60 to selectively send certain DS0 signals or certain DS1 signals received from the ingress network 12 to particular application cards. The shelf controller 52 may instruct the network interface cards 62 to send the certain DS0 signals or the certain DS1 signals to the particular application cards so that the particular application cards can process the certain DS0 signals or the certain DS1 signals. For instance, the shelf controller 52 may instruct the network interface cards to send DS0 signals 1 to 100 to a first application card and DS0 signals 101 to 200 to a second application card.

Other arrangements are also possible consistent with the exemplary embodiments of the present invention. Instead of the shelf controller 52 instructing the application cards 60 as to how to process certain DS0 signals or which DS0 signals to process, the network interface card 62, itself, may instruct the application cards 60. Additionally or alternatively, instead of the shelf controller 52 instructing the network interface cards 62 to send certain DS0 signals to particular application cards, the network interface card 62, itself, may determine (based on the instructions from the signaling gateway) which DS0 signals to send to which application cards 60. Still additionally or alternatively, both the network interface card 62 and the shelf controller 52 may be involved in instructing the application cards 60 as to which DS0 signals to process, how to process the DS0 signals, and/or determining which DS0 signals to send to which application cards 60.

The system manager 50 (i.e., system card) may oversee operation of the cards within the multi-service access platform 16. The system manager 50 may act as a proxy between the ingress network 12, the egress network 14, and the multi-service access platform 16. The system manager 50 may receive management network commands (e.g., from a management network or an out-of-band signaling network) and distribute the management network commands to the cards within the multi-service access platform 16. The system manager 50 also may report status conditions to a management system on the ingress network 12 or on the egress network 14. Still additionally, the system manager 50 may store application code for the cards on the multi-service access platform 16 and initialize new cards added to the multi-service access platform 16.

As already noted, the shelf controller cards 52, system manager 50, application cards 60, network interface cards 62, and packet switch cards 56 may be coupled together by various bus structures. The various bus structures may include a network distribution bus (NDB), media data bus (MDB), system control bus (SCB), hardware resource bus (HRB), and back plane connections. The various bus structures ensure a highest bandwidth between cards and a highest fault tolerance for the communication services provided by the multi-service access platform 16.

Figure 4:
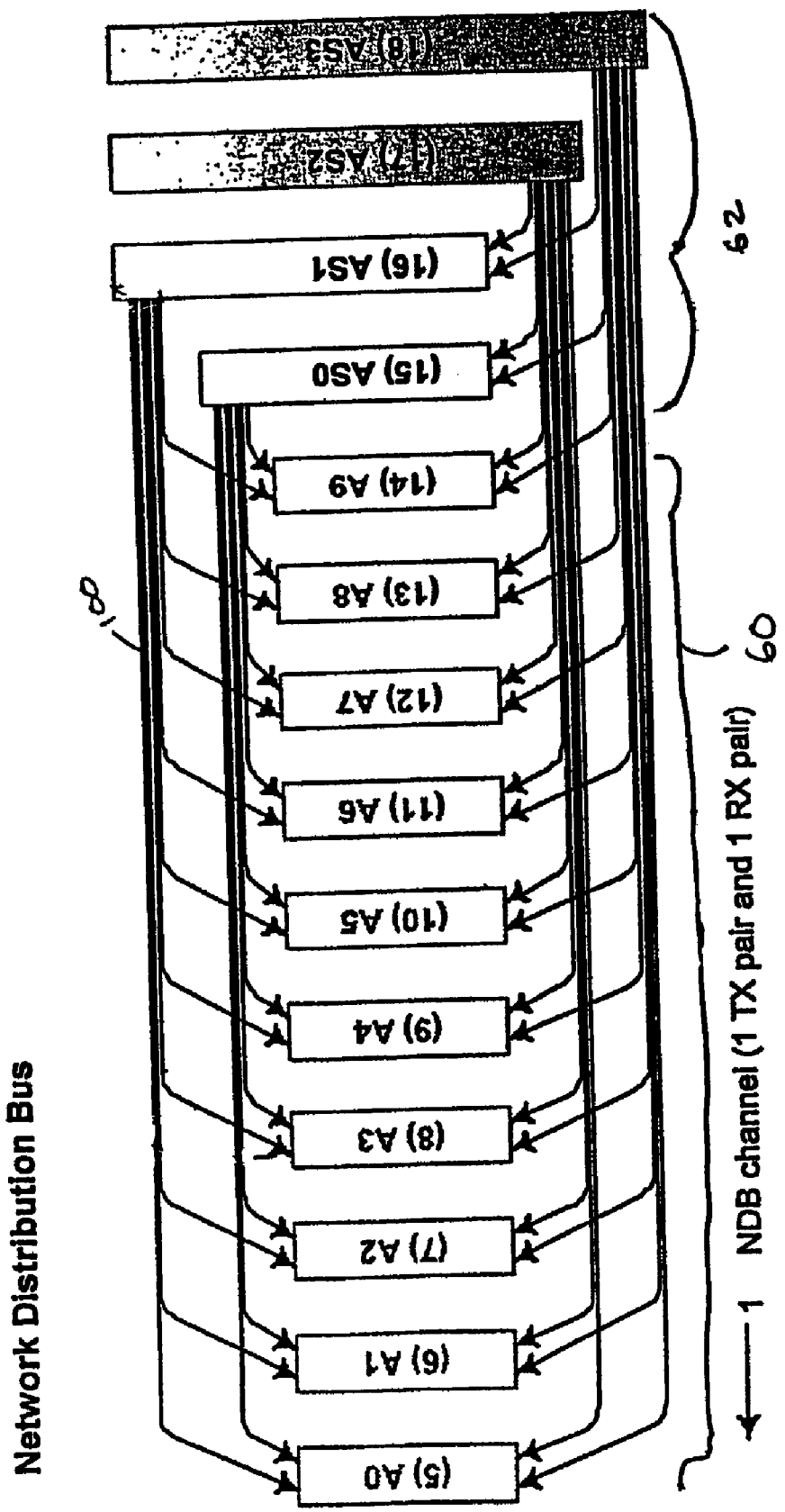
FIG. 4 is a block diagram of network distribution bus (NDB) connectivity within the exemplary multi-service access platform.

FIG. 4 illustrates connectivity for the network distribution bus (NDB) 100. The NDB 100 may couple the network interface cards 62 to the application cards 60. The NDB 100 may utilize point-to-point links, which connect each of the network interface cards 62 to each of the application cards 60. The NDB 100 may send the signals from the ingress network 12 or the egress network 14 to the application cards 60. Additionally, the NDB 100 may couple one network interface card to another network interface card.

The point-to-point links of the NDB 100 may consist of a transmit pair and a receive pair. The transmit pair and the receive pair may extend between a network interface card 62 and an application card 60 or between one network interface card and another network interface card. The network interface cards 62 may receive signals from the ingress network 12 or the egress network 14 and transmit the signals over the transmit pair to the application cards 60. Additionally, the network interface cards 62 may receive signals from the application cards 60 over the receive pair and transmit the signals to the ingress network 12 or the egress network 14.

Each point-to-point link may accommodate multiple physical layer interfaces. For example, the point-to-point links may accommodate low voltage differential signaling (LVDS) and LVPECL (Low Voltage Pseudo Emitter Coupled Logic) physical layer interfaces. Additionally, the point-to-point links may accommodate multiple types of data, e.g., circuit switched or IP data.

The signals that are carried by the NDB may take the form of TDM data or packet data. The form of the data may depend on whether the ingress network 12 or egress network 14 is a PSTN or a PDSN. For example, the PSTN may result in the NDB carrying TDM data while the PDSN may result in the NDB carrying packet data. The TDM data may be formatted as DS0 or DS1 signals while the packet data may be formatted as Gigabit Ethernet. Other arrangements are also possible.

Figure 5:
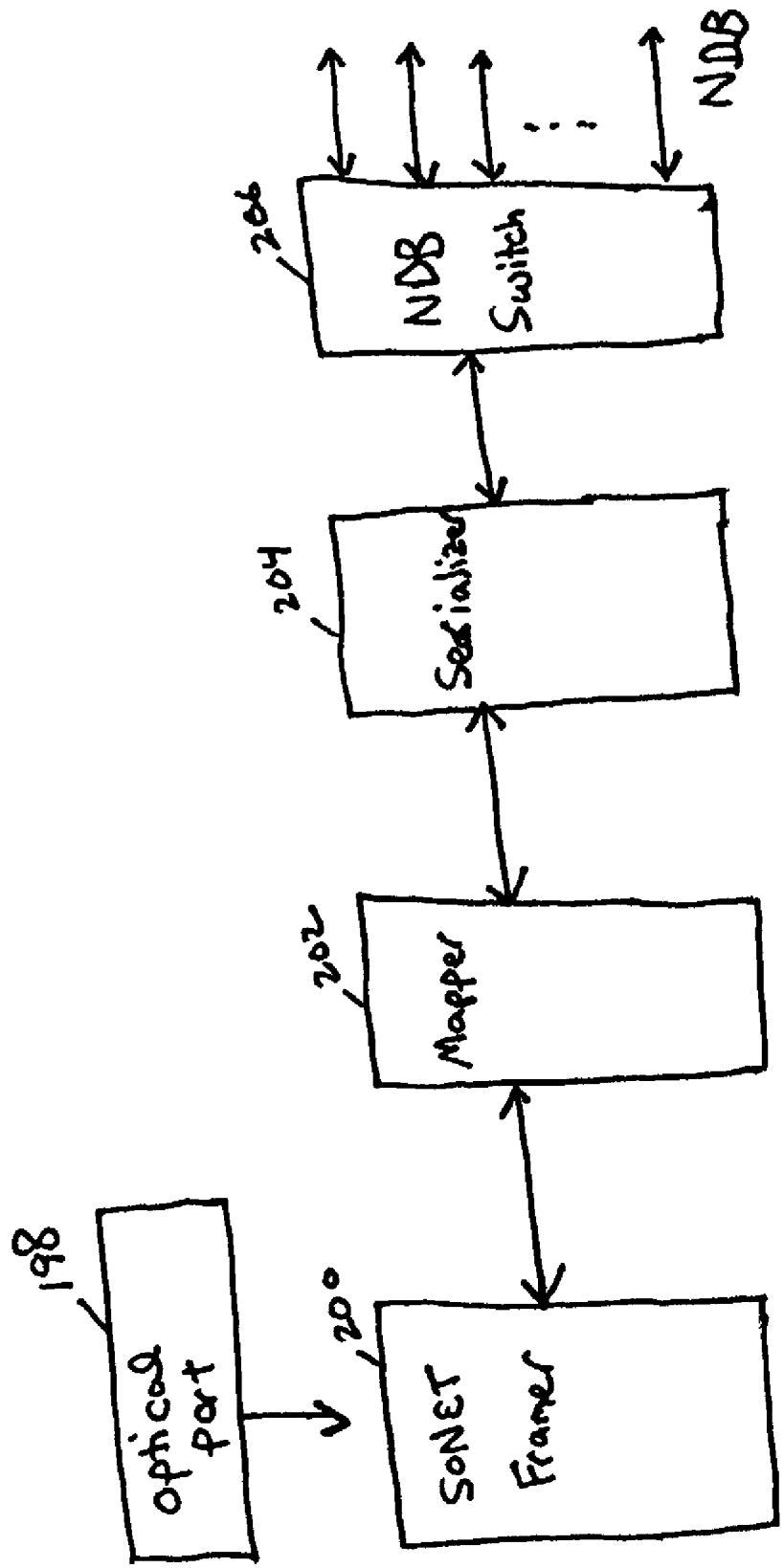
FIG. 5 is a block diagram of network interface circuitry on a network interface card.

FIG. 5 shows an exemplary illustration of network interface circuitry on the network interface card. The interface circuitry may consist a SONET framer 200, a mapper 202, a serializer 204, and an NDB switch 206. The SONET framer 200 may receive SONET signals, e.g., one or more OC-3 streams, from optical ports 198 (on or off the network interface cards) and extract data in the payload of the SONET frame. The SONET framer 200 may be a chip such as PMC Sierra 5316, but other arrangements are also possible.

The data may be formatted as T1, E1, VT1.0, VT1.5, DS2, E3 signals, for example. These formats encapsulate, fundamentally, groupings of DS0 or DS1 signals, for example, albeit with different timing characteristics. The data in the payload of the SONET frame may then be sent to the mapper 202. The mapper 202 may reframe the groupings of DS0 or DS1 signals from the one or more OC-3 streams, so as to demultiplex and multiplex the data. The mapper may be a chip such as PMC Sierra 8316, but other arrangements are also possible.

The DS0 or DS1 signals may be parallel data. If the DS0 or DS1 signals are parallel data, a serializer 204 may convert the parallel data output from the mapper 202 into a serial bit stream. For instance, the serializer 204 may buffer DS0 signals and convert the DS0 signals into a serial bit stream. The serializer 204 may be a chip such as PMC Sierra 8611, but other arrangements are also possible.

The serial bit stream is then transmitted, by the NDB switch 206, over a point-to-point link to one or more application cards. The NDB switch 206 may be a chip such as PMC-Sierra PM8620 NSE-20G which allows for broadcasting the bit serial data stream to all of the application cards 60, but other arrangements are also possible.

Alternatively, the NDB switch 206 can function to switch certain DS0 or DS1 signals defined by the serial bit stream onto certain point-to-point links and for processing by particular application cards. As described above, the shelf controller 52, the network interface card, or both, may signal the NDB switch 206 to switch certain DS0 or DS1 signals to particular point-to-point links and to particular application cards for processing. And on a reverse path, the NDB switch 206 may receive signals from the application cards 60 and switch the signals to one or more of the optical ports 198. Other arrangements are also possible.

Each point-to-point link to the application card may use a separate reference clock. As a result, a baud rate of the point-to-point link to each application card may be independently controlled. The baud rate for a point-to-point link may be initially set at a baud rate suitable for current bandwidth requirements of the application card connected to the point-to-point link. As the application card increases in bandwidth processing capabilities, then the baud rate to the application card may be increased to accommodate the higher bandwidth processing capabilities. But if some of the application cards on the multi-service access platform 14 run at the lower baud rates, then the network interface cards 60 may transmit and/or receive the signals at the lower baud rates to those application cards.

The NDB switch 206 may have the capability to configure one or more of the point-to-point links of the NDB to a baud rate that is a multiple of a system reference clock. The system clock may be running at, for example, 77.76 MHz. When the system clock is running at this rate, the point-to-point links can be configured to run at STS-1 (155 Mbps), STS-3 (622 Mbps), or greater rates, so as to be compatible with application cards coupled to the point-to-point links. The point-to-point links may operate at other rates, depending on the system clock.

The baud rate at which a point-to-point link is to operate may be communicated to the NDB switch 206 as out-of-band communications. The NDB switch 206 may have a port for receiving communication that defines the baud rate at which a particular point-to-point link to a particular application card is to operate. The port may receive the communication that defines the baud rate. For instance, the shelf controller 52 may send baud rate capabilities of the various application cards 60 to the NDB switch 60 by way of the port. In turn, the NDB switch 206 may adjust the baud rate at which the point-to-point link to the application card is to operate.

Alternatively, a portion of the bandwidth within the particular point-to-point link to a particular application card may be allocated to communicate information to the NDB switch 206. The application card coupled to the point-to-point link can use the portion of the bandwidth to communicate the baud rate at which the application card operates to the NDB switch 206. In turn, the NDB switch 206 may configure the baud rate of the point-to-point link that is connected to the application card to match the baud rate at which the application card operates.

Still alternatively, the NDB switch 206 may be programmed to poll a particular application card to determine the baud rate at which the particular application card operates. For instance, the NDB switch 206 may send a message to the particular application card, requesting the baud rate at which the particular application card operates. Based on the poll, the NDB switch 206 may adjust the baud rate of the point-to-point link to the application card to match the baud rate at which the application card 60 operates.

Other arrangements are also possible for adjusting the baud rate of the point-to-point link to the application card. For instance, the baud rate at which the application card operates may be encoded in EEPROM. The shelf controller 52 or the network interface card 62 may retrieve the baud rate from the EEPROM and send the baud rate to the port on the NDB switch 206 that receives baud rate communication. In turn, the NDB switch 206 can receive the baud rate and adjust the baud rate of the point-to-point link. Alternatively, the baud rate of a point-to-point link may be configured manually. For instance, some type of "craft port" may be connected to the NDB switch 206 to establish the baud rate of the point-to-point link. The craft port may facilitate programming the NDB switch 206 with the baud rate of the point-to-point link.

The NDB 100 may carry signals in the form of data and control information. The data may be bearer-based such as voice signals or web content. On the other hand, the control information may take the form of automatic protection switching (APS) information. The APS information may facilitate redundancy on the multi-service access platform 16. For example, when the first network interface card fails or when an error rate of the signals received by the first network interface card exceeds a threshold, the APS information may indicate a switch over from first network interface card to a second network interface card. A set of bits in the form of a switch instruction may be sent over the NDB 100 to indicate that the first network interface card needs to be switched to the second network interface card (i.e., a protection card). An APS controller may identify the set of bits as the switch instruction and instruct the second network interface card (i.e., the protection card) to receive data over the ingress network 12 or the egress network 14, instead of the first network interface card. Additionally, the APS controller may instruct the application cards 60 to switch to the point-to-point link, which couples the application card to the protection card.

Other cards on the multi-service access platform 16 may be made redundant. For example, the packet switch cards 56, the application cards 60, and the shelf controller cards 52 may respond to APS information so as to switch to another packet switch card 56, application card 60, or shelf controller card 52, respectively. Additionally, arrangements other than use of APS information are also possible for facilitating redundancy of the cards on the multi-service access platform 16.

Figure 6:
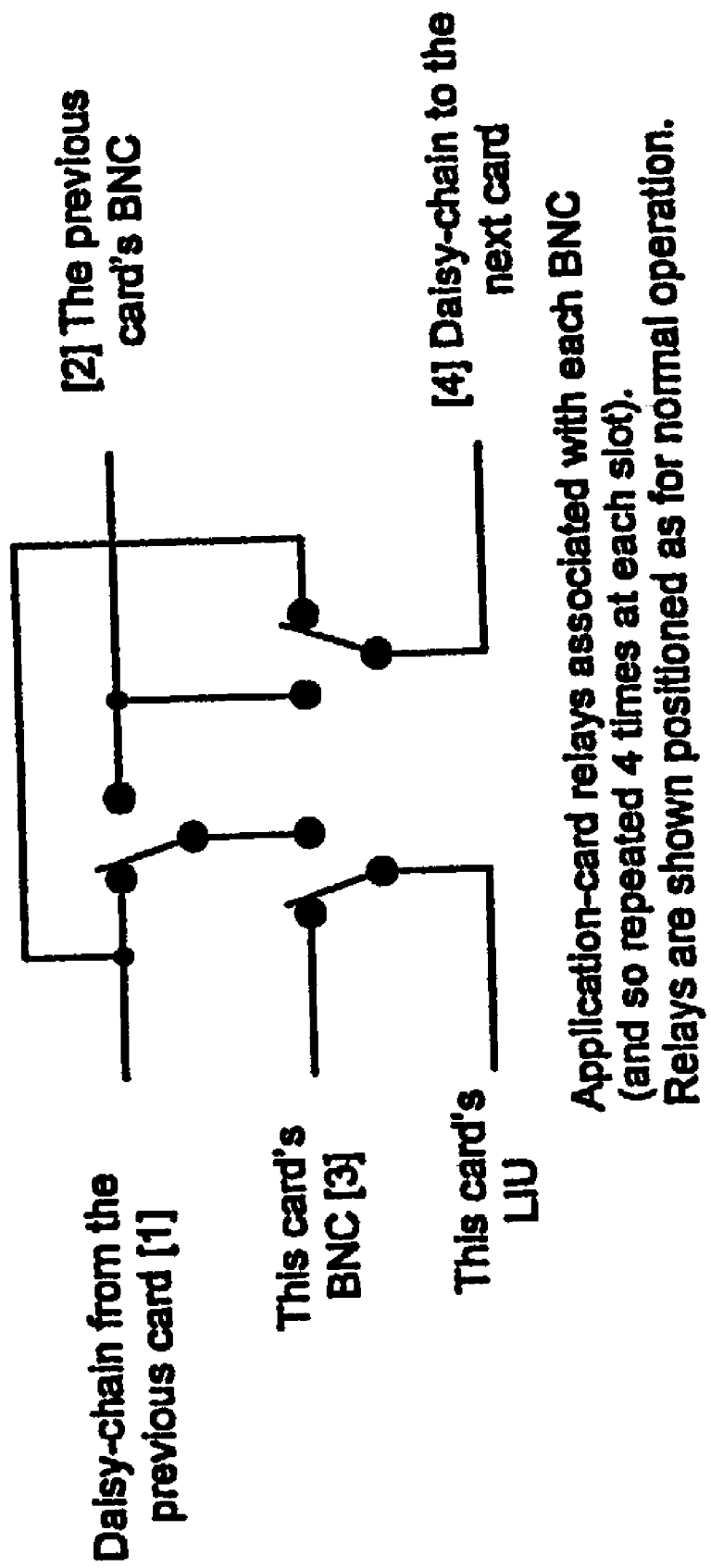
FIG. 6 illustrates daisy chaining cards to support redundancy operation.

FIG. 6 illustrates exemplary hardware for facilitating redundancy switch-over from one card to another card. The cards on the multi-service access platform 16 may be daisy chained together to facilitate the redundancy switch-over. The shelf controller 52 may receive a signal that indicates that a card is disabled. If a card is disabled, the shelf controller 52 may instruct the disabled card to transfer signals input into the disabled card to a neighbor card. For example, the shelf controller 52 may configure relays, as shown by FIG. 6, so that signals input to a previous card (e.g., disabled card) can be transferred to another a next card (e.g., neighbor card). The signals can be transferred from one neighbor card to another until the signal reaches a card designated as the redundancy card. The cards that are daisy chained together may be, for example, the application cards 60 or the network interface cards 62. Other arrangements are also possible.

Figure 7:
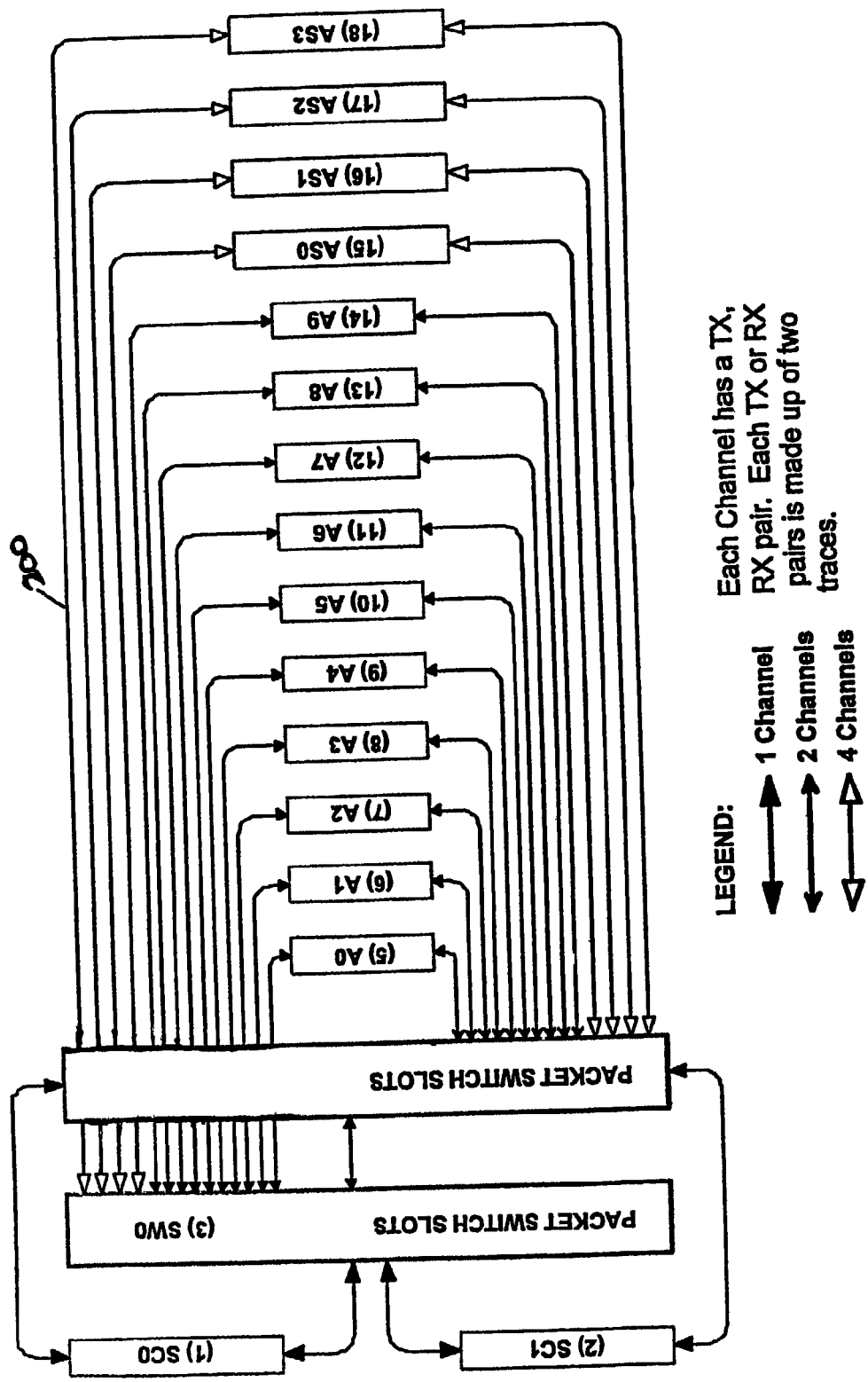
FIG. 7 is a block diagram of media data bus (MDB) connectivity within the exemplary multi-service access platform.

FIG. 7 illustrates bus connectivity for the multi-media data bus (MDB) 200. The MDB 200 may carry packets between the application cards 60, the network interface cards 62, and the shelf controller cards 52. The packet switch cards 56 may switch the packets between the application cards 60, the network interface cards 62, and the shelf controller cards 52. Additionally, the packet switch cards 56 may switch the packets to the egress network 14 in the form of a packet-switched network. The MDB 200 may carry packets in the form of Gigabit Ethernet, but other arrangements are also possible.

The MDB 200, like the NDB 100, may consist of point-to-point links, which carry packets. The point-to-point links may be configured in a star topology so as to connect the application cards 60 and the network interface cards 62 to the packet-switch cards 56. Like the NDB, the point-to-point links may be defined by transmit and receive pairs. The network interface cards 62 and application cards 60 may be coupled by four transmit and receive pairs to the packet switch cards 56. And the shelf controller 52 may be coupled to the packet switch cards 56 by a single transmit and receive pair. Additionally, the application cards 60 may be coupled to the shelf controller 52 by two transmit and receive pairs. Other arrangements are also possible.

The packet switch cards 56 may switch the packets from one card to another card. For example, a first application card may define a packet and send the packet over the MDB to the packet switch card 56. A transmit pair may carry the packet to the packet switch card 56. The packet switch card 56 may read a header of the packet to determine to which application card to route the packet. For example, the header may indicate to route the packet to a second application card. Responsively, the packet switch cards 60 may switch the packet to a receive pair and route the packet to the second application card.

Also, the packet switch cards 56 may switch the packets to the egress network 16. The egress network may be in the form of an IP network. The application cards 60 may define a packet that conforms to IP protocol and is destined to the IP network. The application cards 60 may send the packet to the packet switch cards 56. Based on the header of the packet, the packet switch cards 56, in turn, may send the packet to the egress network 16. The packet switch cards 56 may perform other functions in addition to those described herein.

Figure 8:
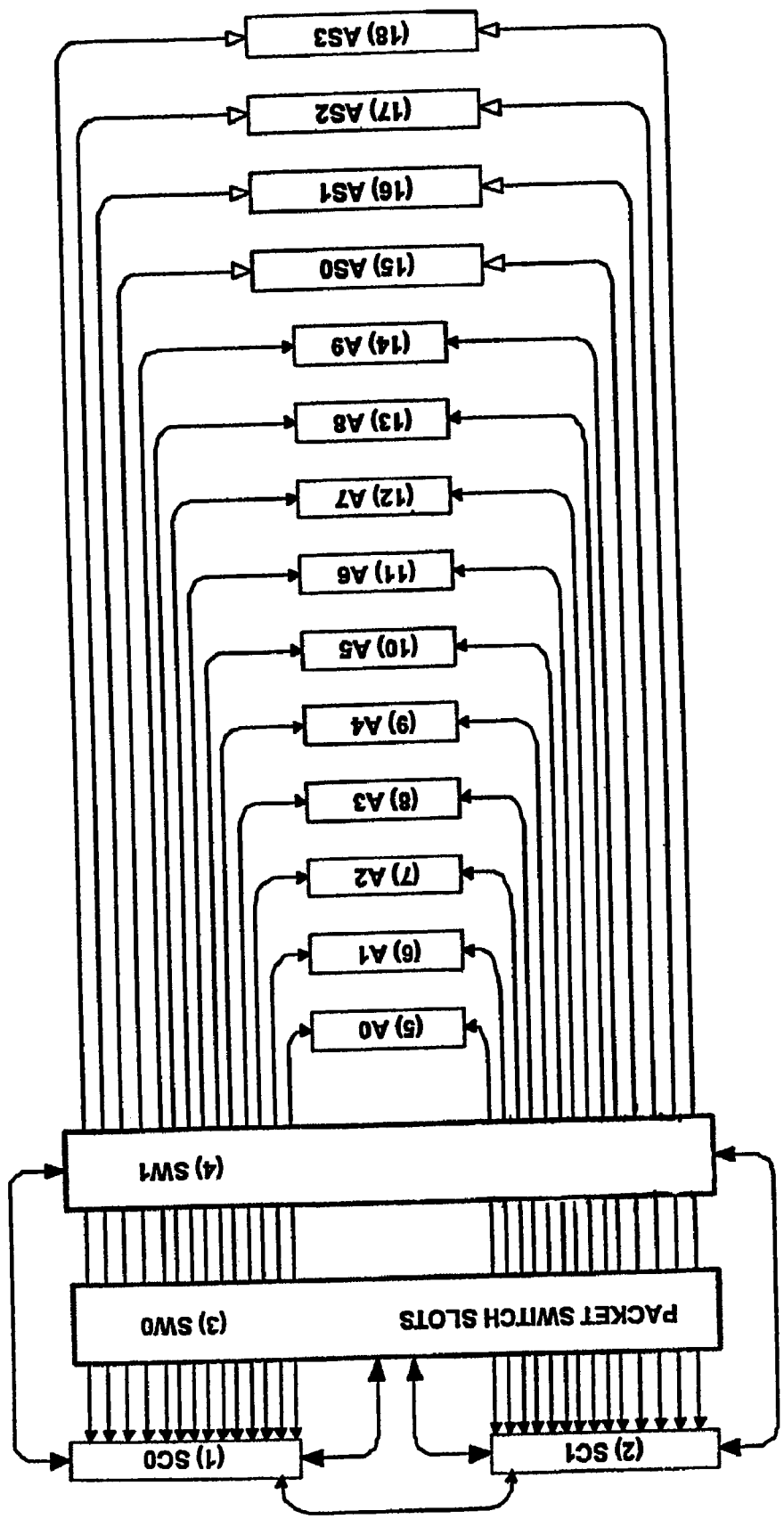
FIG. 8 is a block diagram of system control bus (SCB) connectivity within the exemplary multi-service access platform.
Figure 9:
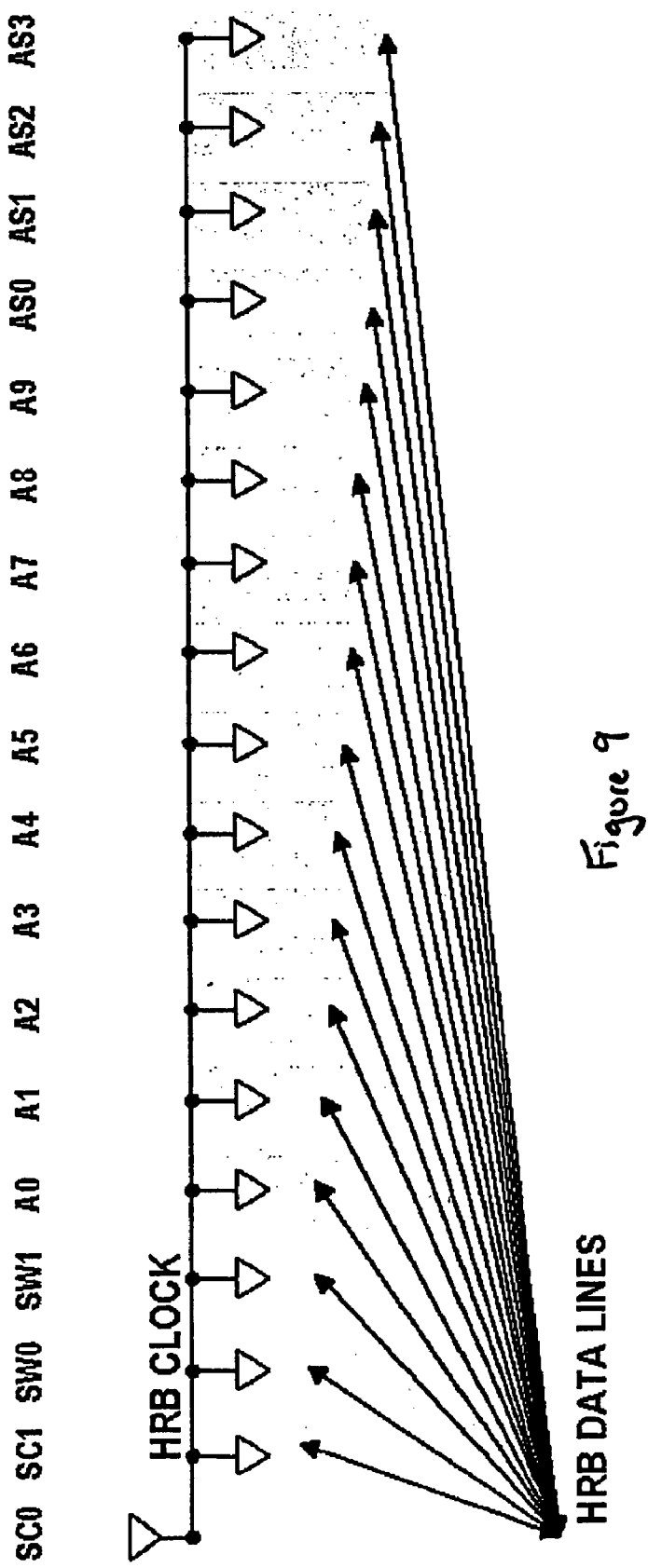
FIG. 9 is a block diagram of hardware resource bus (HRB) connectivity within the exemplary multi-service access platform.

FIGS. 8 and 9 illustrate bus connectivity for the system control bus (SCB) and the hardware resource bus (HRB), respectively.

According to FIG. 8, the SCB may couple the application cards 60 to the shelf controller cards 52. The application cards 60 and the shelf controller cards 52 may each be coupled by two transmit and receive pairs. Additionally, the shelf controller cards 52 and the packets switch cards 56 may be coupled by one transmit and receive pair. Still additionally, the network interface cards 60 may be coupled by four transmit and receive pairs to the shelf controller cards 52. The transmit and receive pairs of the SCB may define an Ethernet bus, such as a 100 Mbit fast Ethernet. Other arrangements are also possible.

The SCB may carry management network commands, status, and alarm conditions. For example, the SCB may carry the control signals from the shelf controller 52 or network interface card 62 that result in a particular application card processing certain DS0 or DS1 signals received over the NDB. Alternatively, the SCB may carry the control signals from the shelf controller 52 or network interface card 62 that result in the NDB switch 206 sending certain DS0 signals over certain point-to-point links and to particular application cards 60. Still alternatively, the SCB may carry signals to facilitate redundancy switchover. The exemplary embodiment of the present invention is not limited by the functions of the SCB.

According to FIG. 9, the HRB may be defined by bi-directional two-wire data lines and a separate shared clock line that link the shelf controller 52 to all or some of the other cards on the multi-service access platform 16. Structure of the HRB may be based upon an I²C bus. The I²C bus is a standard bus structure for integrated circuitry. The I²C bus may support three data transfer speeds, standard at 100 kbps, fast mode at 400 kbps, and high-speed mode at 3.4 Mbps, support cards with 7-bit and 10-bit address spaces, and support cards that operate at different voltages. The HRB may take on characteristics of the I²C bus, as well as other bus structures well known to those skilled in the art.

The HRB may carry low-level control, boot process commands, card status, and card monitoring information. The low level control, boot process commands, card status, and card monitoring information may be available over the HRB even if power is not applied to the card. The shelf controller cards 52 may independently power an HRB section of each card. The HRB section may allow for the shelf controller to read the EEPROM and to determine a card type, serial number, and other information about the card, even if power is not applied to the card.

In addition to the bus structures already described, the multi-service access platform 16 may have a number of timing and redundancy buses. The timing and redundancy buses may increase flexibility of the multi-service access platform 16.

FIG. 10 illustrates a TDM bus. The TDM bus may be a multi-drop bus. The multi-drop bus may include one or more physically separate buses 400, 402 on which the application cards 60 and/or the network interface cards 62 are coupled. The TDM bus may allow for transmitters, receives, and/or transceivers on application cards 60 and network interface cards 62 to send and receive TDM signals between each other. The TDM bus may carry DS0 or DS1 signals between the application cards 62 and the network interface cards 60, in addition to the NDB 100, but other arrangements are also possible.

For example, an application card 60 may need to send TDM signals to the NDB switch so that the TDM signals can be sent over the optical port 198. The application card may send the TDM signals over the TDM bus. The TDM bus may carry the TDM signals to the NDB switch 206. In turn, the NDB switch 206 may forward the TDM signals to the serializer 204, mapper 202, and framer 200. The serializer 204, mapper 202, and framer 200 may aggregate TDM signals from one or more application cards. Then, the TDM signals may be formatted into an OC-3 signal, for example, that is sent over the optical port 198.

FIG. 11 illustrates a system timing bus (STB). The STB may also be a multi-drop bus including two or more physically separate buses 300, 302. The STB may couple the application cards 60 and the network interface cards 62. The STB may carry a plurality of signals that defines timing information for the cards on the multi-service access platform 16. For example, the STB may include a system clock bus 300 and a reference clock bus 302. The system clock bus 300 may carry a system clock timing signal for referencing all clocking in the multi-service access platform. And the reference clock bus 302 may carry a reference clock timing signal for synchronizing other clocks of lower stability. The STB may synchronize all of the cards on the multi-service access platform to the system clock 300 and the reference clock 302. The STB may perform other functions as well.

FIG. 12 illustrates a SONET protection bus (SPB). The SPB may be a point-to-point bus that couples optical line port interface cards together. The multi-service access platform 16 may have, for example, two pairs of optical line port interface cards 500, 502 coupled to the SPB. If the ingress network 12 or the egress network 14 is a SONET network, a SONET over Ethernet network, or a packet over SONET network (POS), then the ingress network 12 or the egress network 14 may be coupled to the pair of the optical line port interface cards 500, 502. The SONET network architecture is defined by a ring structure. The SBB couples the pair of the optical line port interface cards together to complete the ring structure of the SONET network.

The optical line port interface cards may have optical-to-electrical transceivers. The optical-to-electrical transceivers, e.g., optical ports 198, may convert optical signals defining SONET traffic into electrical signals to be sent to the network interface cards 62. The electrical signals may be compatible with hardware on the network interface cards 62 and the multi-service access platform 16. Additionally, the optical-to-electrical transceivers may transmit SONET traffic through the multi-service access platform 16 and to the SONET network. The optical-to-electrical transceiver may convert electrical signals defining the SONET traffic into optical signals to be transmitted over the SONET network.

Additionally, the SPB may be used to provide optical port protection. The SPB may be used to route an electrical equivalent of data received from an optical network from one optical line port interface card to another. The SPB may be used to route the electrical equivalent of the data if an optical line port interface card fails, but other arrangements are also possible.

Exemplary embodiments of the present invention have been described. Those skilled in the art will understand, however, that changes and modifications may be made to these embodiments without departing from the true scope and spirit of the present invention, which is defined by the claims.

We claim:

1. A system for sending signals between a first network and a second network, the system comprising:
   network interface cards;
   application cards; and
   a switching fabric;
   the network interface cards having (i) a first plurality of ports for exchanging the signals with the first network; and (ii) a first plurality of point-to-point links for exchanging the signals with the application cards;
   the application cards having a second plurality of point-to-point links connected to the switching fabric for exchanging the signals between the application cards;
   the switching fabric having a second plurality of ports for exchanging the signals with the second network;
   at least one shelf controller card, the at least one shelf controller card being coupled to the network interface cards and to the application cards by a third plurality of point-to-point links,
   wherein the signals at the first plurality of ports are in a time-division multiplexed format and the signals at the second plurality of ports are in a packetized format;
   wherein the signals are transferable between the first network, the network interface cards, the application cards, and the second network; and
   wherein a network distribution bus switch coupled to the first plurality of links facilitates adjustment of a baud rate of certain of the signals sent to a particular application card over a given link.

2. The system of claim 1, wherein the first network is an ingress network, the second network is an egress network, the first plurality of ports are ingress ports, and the second plurality of ports are egress ports.

3. The system of claim 1, wherein the first network is a circuit-switched network and the second network is a packet-switched network.

4. The system of claim 1, wherein the second network is a PSTN.

5. The system of claim 1, wherein the second network is an IP network.

6. The system of claim 1, wherein the switching fabric comprises at least one packet-switch card for switching the signals between the application cards.

7. The system of claim 1, wherein the first plurality of ports and the second plurality of ports exchange the signals with the network interface cards according to a format selected from the group consisting of SONET, Gigabit Ethernet, and 100 Mbps Ethernet.

8. The system of claim 1, wherein the first plurality of point-to-point links exchange the signals between the application cards according to a format selected from the group consisting of DS0 and DS1 signals.

9. The system of claim 1, wherein the at least one shelf controller comprises computer instructions stored in memory and executable by a processor for performing the functions of:
   making a determination that an application card is compatible with a system configuration; and based on the determination, applying power to the application card.

10. The system of claim 1, wherein the at least one shelf controller comprises computer instructions stored in memory and executable by a processor for performing the function of instructing a particular application card to process certain of the signals received from the first network.

11. The system of claim 1, wherein the at least one shelf controller comprises computer instructions stored in memory and executable by a processor for performing the functions of instructing a particular network interface card to send to a particular application card, certain of the signals received from the first network.

12. The system of claim 1, wherein the at least one shelf controller comprises computer instructions stored in memory and executable by a processor for performing the functions of instructing a particular network interface card to adjust a baud rate of certain of the signals sent to a particular application card over a given link.

13. The system of claim 1, wherein the at least one shelf controller comprises computer instructions stored in memory and executable by a processor for performing the function of instructing a particular application card to execute computer instructions for processing the signals received from the first network.

14. The system of claim 1, further comprising a plurality of buses, the plurality of buses coupling the network interface cards to the application cards, the plurality of buses carrying TDM signals and clock signals.

15. The system of claim 1, wherein the network interface cards comprise computer instructions stored in memory and executable by a processor for performing the function of instructing a particular application card to process certain of the signals received from the first network.

16. The system of claim 1, wherein the network interface cards comprise computer instructions stored in memory and executable by a processor for sending to a particular application card, certain of the signals received from the first network.

17. The system of claim 1, wherein the network interface cards comprise computer instructions stored in memory and executable by a processor for adjusting a baud rate of certain of the signals sent to a particular application card over a given link.

18. The system of claim 1, wherein the network interface cards comprise computer instructions stored in memory and executable by a processor for performing the function of instructing a particular application card to execute computer instructions for processing the signals received from the first network.

19. A system for sending signals between a first network and a second network, the system comprising:
 network interface cards;
 application cards;
 a switching fabric;
 at least one shelf controller coupled to the network interface cards and to the application cards by a third plurality of point-to-point links, wherein the at least one shelf controller comprises computer instructions stored in memory and executable by a processor for performing the functions of (a) making a determination that an application card is compatible with a system configuration, and (b) based on the determination, applying power to the application card;
 the network interface cards having (i) a first plurality of ports for exchanging the signals with the first network; (ii) a first plurality of point-to-point links for exchanging the signals with the application cards; and (iii) a second plurality of ports for exchanging the signals with the second network;
 the application cards having a second plurality of point-to-point links connected to the switching fabric for exchanging the signals between the application cards;
 wherein at least one optical line interface card is coupled to the first plurality of ports and the second plurality of ports, the at least one optical line interface card comprising at least one optical-to-electric transceiver for sending and receiving the signals with the first network and the second network, respectively;
 wherein the signals at the first plurality of ports are in a time-division multiplexed format and the signals at (i) the switching fabric and (ii) the second plurality of ports are in a packetized format; and
 wherein the signals are transferable between the first network, the network interface cards, the application cards, and the second network.

20. The system of claim 19, wherein the at least one shelf controller comprises computer instructions stored in memory and executable by a processor for performing the function of instructing a particular application card to process certain of the signals received from the first network.

21. The system of claim 19, wherein the at least one shelf controller comprises computer instructions stored in memory and executable by a processor for performing the functions of instructing a particular network interface card to send to a particular application card, certain of the signals received from the first network.

22. The system of claim 19, wherein the at least one shelf controller comprises computer instructions stored in memory and executable by a processor for performing the functions of instructing a particular network interface card to adjust a baud rate of certain of the signals sent to a particular application card over a given link.

23. The system of claim 19, wherein the at least one shelf controller comprises computer instructions stored in memory and executable by a processor for performing the function of instructing a particular application card to execute computer instructions for processing the signals received from the first network.

24. The system of claim 19, wherein a network distribution bus switch coupled to the first plurality of links facilitates adjustment of a baud rate of certain of the signals received from the first network and sent to a particular application card over a given link.

25. The system of claim 19, further comprising a plurality of buses, the plurality of buses coupling the network interface cards and the application cards, the plurality of buses carrying TDM signals and clock signals.

26. The system of claim 19, wherein the first network is a circuit-switched network and the second network is a packet-switched network.

27. The system of claim 19, wherein the first network is a PSTN.

28. The system of claim 19, wherein the second network is an IP network.

29. The system of claim 19, wherein the first plurality of point-to-point links send and receive the signals according to a format selected from the group consisting of DS0 and DS1 signals.

30. The system of claim 19, wherein the switching fabric comprises a packet-switch card for switching the signals between the application cards.

31. The system of claim 19, wherein the first plurality of ports and the second plurality of ports exchange the signals with the network interface cards according to a format selected from the group consisting of SONET, Gigabit Ethernet, and 100 Mbps Ethernet.

32. The system of claim 19, wherein the network interface cards comprise computer instructions stored in memory and executable by a processor for performing the function of instructing a particular application card to process certain of the signals received from the first network.

33. The system of claim 19, wherein the network interface cards comprise computer instructions stored in memory and executable by a processor for sending to a particular application card, certain of the signals received from the first network.

34. The system of claim 19, wherein the network interface cards comprise computer instructions stored in memory and executable by a processor for adjusting a baud rate of certain of the signals sent to a particular application card over a given link.

35. The system of claim 19, wherein the network interface cards comprise computer instructions stored in memory and executable by a processor for performing the function of instructing a particular application card to execute computer instructions for processing the signals received from the first network.

36. A method for transferring signals from an ingress network to an egress network, the method comprising:
    network interface cards receiving the signals from the ingress network through a plurality of ingress ports;
    the network interface cards sending the signals to application cards through a plurality of point-to-point links;
    adjusting a baud rate of the signals sent over a given link to a particular application card;
    instructing a particular application card to process certain of the signals received from the ingress network prior to sending the signals to the particular application card;
    the application cards receiving the signals from the network interface cards;
    the application cards sending the signals to a switching fabric; and
    the switching fabric sending the signals to the egress network through a plurality of egress ports.

37. The method of claim 36, further comprising instructing a particular network interface card to send certain of the signals received from the ingress network to a particular application card through a given link.

38. The method of claim 36, further comprising instructing a particular application card to execute computer instructions for processing the signals received from the ingress network prior to sending the signals to the particular application card.

39. The method of claim 36, further comprising:
    the application cards sending the signals through the plurality of point-to-point links to the network interface cards;
    the network interface cards receiving the signals from the application cards through the plurality of point-to-point links; and
    the network interface cards sending the signals to the egress network through a separate plurality of egress ports.

40. A method for transferring signals from an ingress network to an egress network, the method comprising:
    network interface cards receiving the signals from the ingress network through a plurality of ingress ports;
    instructing a particular network interface card to send certain of the signals received from the first network to a particular application card through a given link;
    adjusting a baud rate of the signals sent over the given link to the particular application card prior to sending the signals to the particular application card over the given link;
    the network interface cards sending the signals to application cards through a plurality of point-to-point links;
    the application cards receiving the signals from the network interface cards;
    a switching fabric switching the signals between the application cards;
    the application cards sending the signals to the network interface cards through the plurality of point-to-point links; and
    the network interface cards sending the signals to the egress network through a plurality of egress ports.

41. The method of claim 40, further comprising instructing a particular application card to process certain of the signals received from the first network prior to sending the signals to the particular application card through the given link.

42. The method of claim 40, further comprising instructing a particular application card to execute computer instructions for processing the signals received from the first network prior to sending the signals to the particular application card.

43. The method of claim 40, wherein the switching fabric has a separate plurality of egress ports, the method further comprising the network interface cards sending the signals to the egress network through the separate plurality of egress ports.

* * * * *